N. P. Clarke.
Spool-Stand.

No 76997. Patented Apr. 21, 1868.

Witnesses
H. C. Ashkettle
Wm A Morgan

Inventor
N. P. Clarke
per Munn &
Attorneys

United States Patent Office.

NICHOLAS P. CLARKE, OF CENTRAL FALLS, RHODE ISLAND, ASSIGNOR TO HIMSELF AND CHARLES E. GRIFFIN, OF SAME PLACE.

Letters Patent No. 76,997, dated April 21, 1868.

IMPROVED SPOOL-STAND.

*The Schedule referred to in these Letters Patent and making part of the same.*

TO ALL WHOM IT MAY CONCERN:

Be it known that I, NICHOLAS P. CLARKE, of Central Falls, in the county of Providence, and State of Rhode Island, have invented a new and improved Spool-Stand; and I do hereby declare that the following is a full, clear, and exact description thereof, which will enable others skilled in the art to make and use the same, reference being had to the accompanying drawings, forming part of this specification.

This invention relates to a new and useful combination of a revolving spool-stand, needle-case, and thread-cutter, as hereinafter fully shown and described, whereby needles may be threaded directly from the spools on the stand, and the thread cut of any desired length. In the accompanying sheet of drawings—

Figure 1:
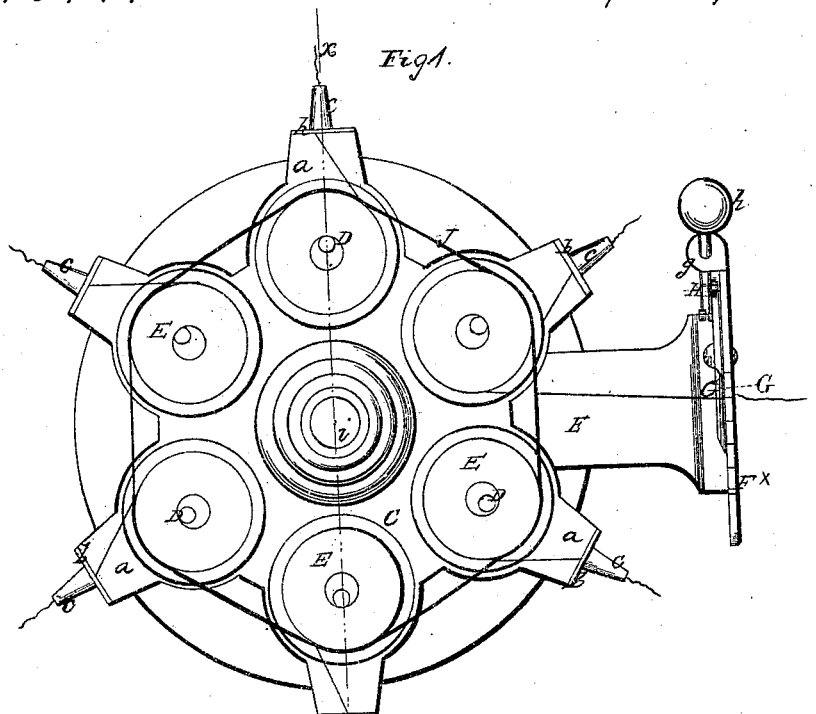

Figure 1 is a plan or top view of my invention.

Figure 2:
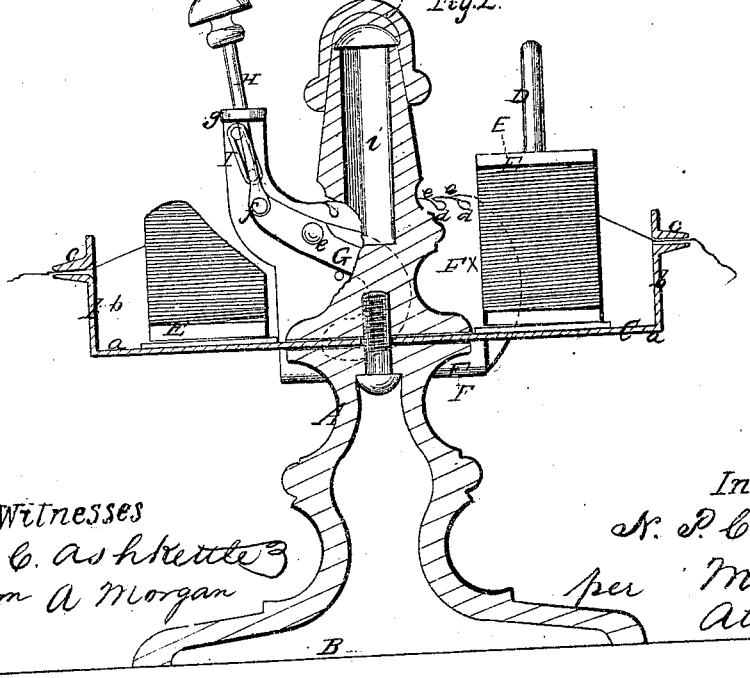

Figure 2, a side sectional view of the same, taken in the line $x\,x$.

Similar letters of reference indicate corresponding parts.

A represents an upright, provided with a base or support, B, and having fitted upon it a horizontal plate, C, which is allowed to rotate freely on the upright. This plate has a series of upright rods, D, attached to it at equal distances apart, near its periphery, on each of which a spool of thread, E, is fitted, and allowed to turn or rotate freely. The plate C is formed with a projection, $a$, which extends radially outward from each spool, and is bent upward at its outer part at right angles, as shown at $b$, and these upright parts $b$ are each provided with a tube, $c$, through which the threads of the spools pass, said tubes serving as guides for the threads.

F represents a horizontal plate, which is fitted permanently on the upright, A, just below the revolving plate C, the plate F extending out beyond the plate C, and having an upright plate, $F^\times$, at its outer end. The upper edge of the plate $F^\times$ is notched to allow the threads of the spools to catch into them, a series of said notches being made and formed by drilling small holes $d$, through plate $F^\times$, near its upper edge, and then slitting the upper edge of the plate, as shown at $e$, so that the threads may pass into said holes. A series of these notches is made, so that a thread, if it should slip over or fail to catch into one notch, may catch into another. To the inner side of the upright plate $F^\times$, is attached, by a pivot, $e$, a knife, G, the upper edge of which is curved, and is the cutting-edge; said edge being of sufficient length to sweep, when raised, over the whole of the notches in plate $F^\times$, so that a thread in any one of said notches will be cut. One end of the knife G has a plunger-rod, H, attached to it by a pivot, $f$, and this rod works in a guide, $g$, on the plate $F^\times$, and is provided with a knob, $h$, at its upper end, and the end of the knife G, where the rod H is attached, has a spring, I, connected to it, which spring has a tendency to keep the knife depressed or the cutting-edge below the notches in the upper edge of plate $F^\times$, as will be fully understood by referring to fig. 2.

From the above description it will be seen that by turning the plate C, any spool, E, may be brought in line with the plate F', and the needle threaded direct from the spool, and when a sufficient length of thread is unwound from the spool, the thread is fitted in one of the notches in plate F', the plunger-rod H pressed down, and the knife G thereby raised and the thread cut.

The spools E have an elastic, I, fitted around them to produce sufficient friction to prevent the too free or casual turning of the spools on the rods D. The upper part of the upright, A, is tubular, to serve as a needle-case or receptacle, as shown at $i$, and a cap, $j$, is fitted on the top of A, to serve as a cover.

I claim as new, and desire to secure by Letters Patent—

The spool-stand, constructed as described, consisting of the revolving spool-carrying plate C, provided with upturned radial arms $a\,b$, having tubes $c$, the fixed right-angular plate F $F^\times$, pivoted knife G, and operating spring-arm H, all arranged and operating as described for the purpose specified.

The above specification of my invention signed by me, this 8th day of February, 1868.

NICHOLAS P. CLARKE.

Witnesses:
WM. F. McNAMARA,
ALEX. F. ROBERTS.